(No Model.) 2 Sheets—Sheet 1.

J. T. EVANS & J. H. DOUGLASS.
MACHINE FOR CUTTING HAY STACKS.

No. 481,393. Patented Aug. 23, 1892.

WITNESSES:
Donn Twitchell
C. Sedgwick

INVENTORS:
J. T. Evans
J. H. Douglass
By Munn & Co.
ATTORNEYS.

(No Model.) 2 Sheets—Sheet 2.
J. T. EVANS & J. H. DOUGLASS.
MACHINE FOR CUTTING HAY STACKS.
No. 481,393. Patented Aug. 23, 1892.
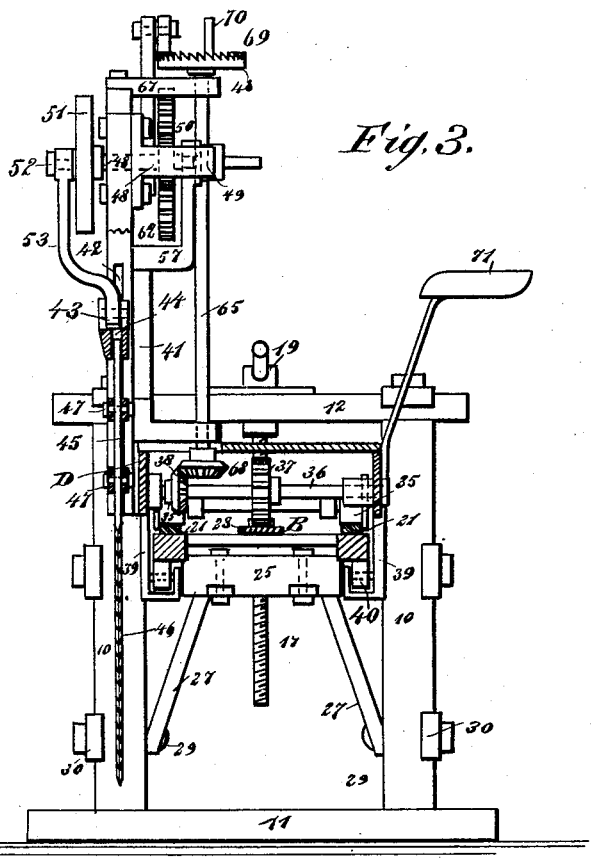
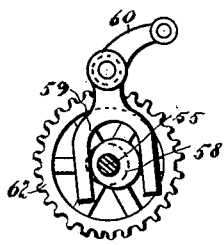
Fig. 6
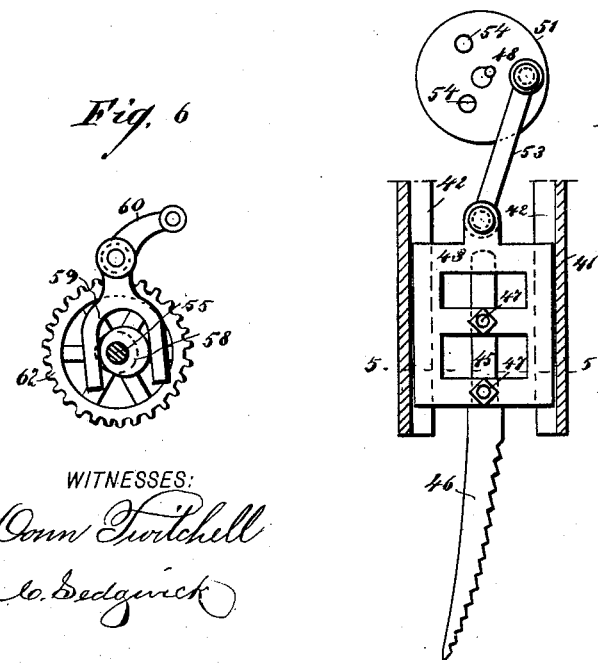
Fig. 4
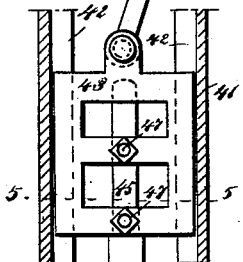
Fig. 5
WITNESSES:
Donn Twitchell
C. Sedgwick
INVENTORS:
J. T. Evans
J. H. Douglass
By Munn & Co
ATTORNEYS.

UNITED STATES PATENT OFFICE.

JOHN T. EVANS AND JOSEPH H. DOUGLASS, OF ADAMSVILLE, UTAH TERRITORY.

MACHINE FOR CUTTING HAY-STACKS.

SPECIFICATION forming part of Letters Patent No. 481,393, dated August 23, 1892.

Application filed March 19, 1892. Serial No. 425,513. (No model.)

*To all whom it may concern:*

Be it known that we, JOHN T. EVANS and JOSEPH H. DOUGLASS, of Adamsville, in the county of Beaver and Territory of Utah, have invented a new and Improved Machine for Cutting Hay-Stacks, of which the following is a full, clear, and exact description.

Our invention relates to a machine adapted for cutting hay in hay-stacks, and has for its object to provide a machine capable of being placed above the hay-stack or over bodies or piles of hay.

A further object of the invention is to so construct the machine that large or small sections of hay composing the stack may be cut out in order that the hay may be more readily removed for baling or transportation purposes and in bulk, and also so that the hay can be more easily and economically fed to cattle and other live stock.

Another object of the invention is to provide a machine capable of accomplishing the above named results, which may be operated by hand and carried across the stack to be operated upon or stopped at any point desired.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
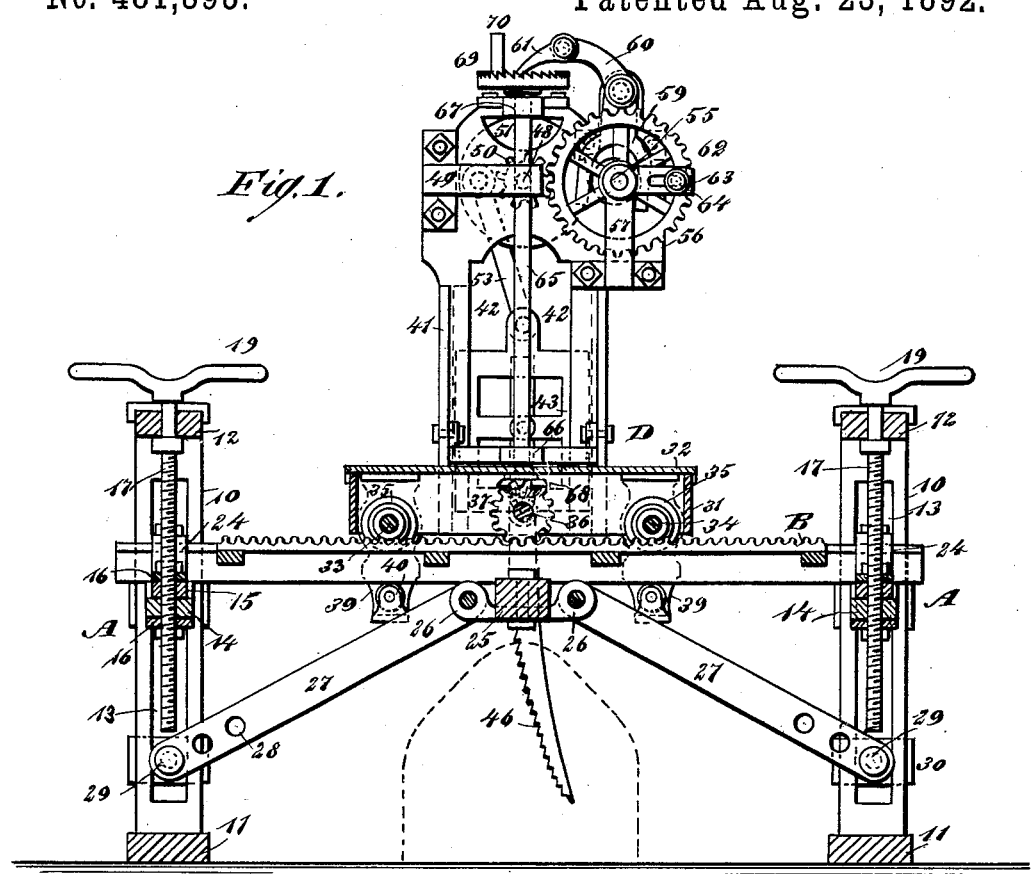
Figure 2:
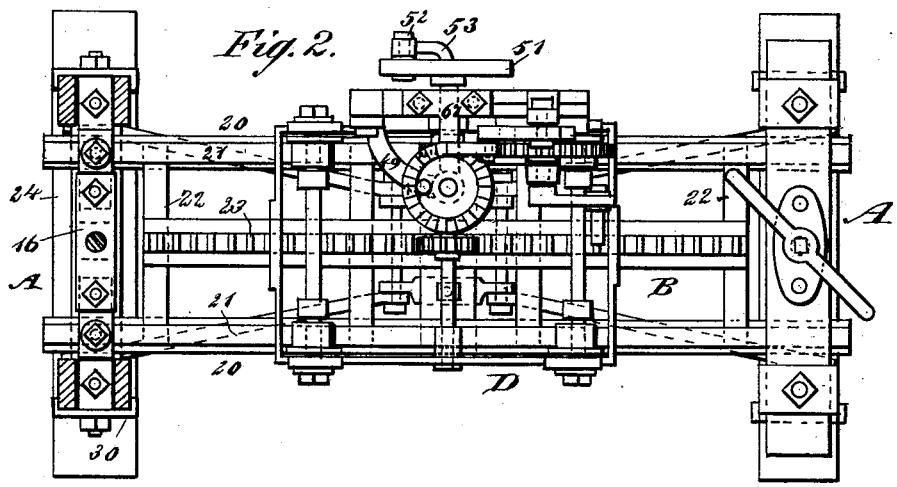

Figure 1 is a longitudinal section through the machine, taken practically at its center. Fig. 2 is a plan view. Fig. 3 is a transverse section through the machine, also taken practically near its center. Fig. 4 is a detail view of the hay-knife, its slide, and the actuating mechanism for the slide. Fig. 5 is a transverse section through the slide or cross-head and its slideways, said section being taken practically on the line 5 5 of Fig. 4; and Fig. 6 is a detail view illustrating the mechanism for feeding the carriage of the machine over the stack.

The frame of the machine consists of two vertical trestles A, and a bed B, supported by the trestles, the said bed being vertically adjustable. The trestles are of like construction and comprise two opposed side pieces 10, connected at the bottom by a base-beam 11 and at the top by a head-beam 12. Each of the side pieces has a longitudinal opening 13 formed therein of a length almost equal to the length of the sides, and in the openings 13 of the trestles beams 14 have vertical movement, the said beams constituting the end supports for the bed B. These beams 14 at their centers are recessed in their upper faces to receive nuts 15, and are preferably covered at top and bottom by metal plates 16. The upper plates of the beams cover the nuts 15, which are held stationary in the beam, and the upper and lower plates are provided with openings registering with the openings in the nuts. These beams of the bed are raised or lowered through the medium of adjusting-screws 17, which screws are held to turn in the head-beams 12 of the trestles, passing downward through said beams and through the nuts 15 in the end beams of the bed, as is best illustrated in Fig. 1. Thus by manipulating the adjusting-screws 17, which at their upper ends are provided with attached wings 19, the bed B may be raised or lowered, as required, to adjust the machine to the stack to be operated upon. The bed B comprises, virtually, two side beams 20, supporting rails 21, the upper surfaces of which rails are ordinarily made flat, and cross-ties 22, connecting the side beams 20, which cross-beams support a longitudinally-located rack 23. The rack is placed at the center of the bed and extends from end to end thereof, being supported intermediate of its length and attached to the bed in any suitable or approved manner. Ordinarily in attaching the beams 20 of the bed to the end adjusting-beams 14 metal straps 24 are employed.

In order to support the central portion of the bed and yet not interfere with its vertical adjustment, a beam or block 25 is made to engage with the lower surface of the bed at its center, and this beam is recessed upon its upper face at its ends, the recesses being adapted to receive the inner lower edges of the side beams of the bed. This central block or beam 25, near its ends, has projected from opposite sides eyes 26, and to each eye a link 27 is pivotally connected. These links at their lower ends are provided with a series of apertures or openings 28 and the links are adjustably connected with the trestles by bolts 29, which are passed through the openings 13 in the sides of the trestles and through plates 30, adapted to slide upon and engage with the outer faces of the said trestle side pieces. Thus when the bed is lowered the bolts 29 are passed through one of the inner apertures in the links, and when the bed is raised the bolts enter the lower or outer apertures. When the bed has been adjusted to the desired position, the nuts of the bolts 29 are tightened, which will clamp the lower ends of the links 29 and the plates 30 to the trestle and thereby firmly connect the links with the trestle.

A carriage D is adapted to travel upon the bed B. The main frame or base 31 of the carriage is preferably made rectangular in general contour and in skeleton form, the frame being normally covered at the top by a plate or platform 32. This frame has journaled near each end a transverse shaft. (Designated, respectively, in the drawings as 33 and 34.) Each of these shafts carries within the frame, near each end, a wheel 35, the said wheels being adapted to travel upon the tracks or rails 21 of the bed. The frame is further provided with a central shaft 36, and this shaft has secured thereon a spur-wheel 37, engaging with the teeth of the rack 23 of the bed. The shaft 36 is further provided near one end with a bevel-gear 38, as is best shown in Fig. 3. The frame or base of the carriage is held upon the bed and is prevented from leaving it by attaching to the sides of the frame brackets 39, which are projected downward below the sides of the bed and are carried upward to form bearings for friction-rollers 40, as shown in Figs. 1 and 3, the said friction-rollers engaging with the lower faces of the bed side pieces.

At the rear side of the frame or base of the carriage a standard 41 is upwardly projected. This standard is practically solid at its upper end; but the lower portion thereof is recessed longitudinally to form slideways 42 for the reception of a cross-head 43, the said cross-head having movement in the slotted portion of the standard. This cross-head, as shown in detail in Fig. 4, is thickest at its center, and is made up of side and top bars and a central cross-bar, the top and bottom and intermediate cross-bar being provided with recesses 44, the recesses in the bottom and in the intermediate bar extending through them, while the recess in the upper bar of the cross-head does not extend through to the top. The recesses 44 in the cross-head are adapted for the reception of the shank 45 of any approved form of hay-knife 46, the knife being adapted to extend any desired distance below the cross-head, and the knife is removably held in engagement with the cross-head, preferably by bolts and nuts 47, passed through the intermediate and lower cross-bars of said cross-head. The cross-head is actuated by a shaft 48, journaled in the upper solid portion of the standard, and extending beyond both faces thereof, the inner end of the shaft being journaled and supported in a bracket 49, attached to the inner solid face of the standard. This shaft, between the bracket 49 and the standard, is provided with an attached pinion 50, and upon the outer end of the shaft a disk 51 is secured, carrying an adjustable wrist-pin 52, and through the medium of a pitman 53 the wrist-pin is connected directly with the top of the cross-head 43. The wrist-pin is adjustable in the disk, inasmuch as a series of apertures 54 is produced in the disk, as shown in Fig. 4, at different distances from its center, and this adjustment is provided for in order that the length of the knife-strokes may be varied as the character of the work may demand. The disk also acts as a balance-wheel to equalize the speed of the cutter or knife.

Parallel with the shaft 48 a second shaft 55 is journaled in an extension 56, formed at one side of the standard 41 at its upper portion, the inner end of this shaft being supported and journaled in a bracket 57, extending upward from the inner face of the extension 56, as shown in Fig. 1. This shaft is provided with a cam 58, as is best illustrated in Fig. 6, adapted to act upon a fork 59, engaging with the peripheral surface of the cam, and as the shaft 55 is revolved the fork is reciprocated. This fork has connected therewith an arm 60, which arm at its upper extremity has pivoted thereto a dog 61. The shaft 55 also carries a driving-wheel 62, as the shaft is the driving-shaft of the machine, and the driving-wheel 62 meshes with the wheel 50 upon the parallel shaft 48. The drive-shaft is adapted to be turned by hand, and to that end at its inner extremity a crank 63 is secured, the handle 64 of the crank being adjustable upon the body thereof, and this adjustment is made in order that the radius of the handle of the crank may be adjusted to correspond to varying lengths of the knife-stroke.

The carriage is fed forward through the medium of a vertical shaft 65, journaled at its lower end in a bracket 66, produced upon the inner face of the carriage-standard 41, and the upper portion of the shaft is journaled in the bracket 49, above referred to, and also in a second bracket 67, located at the extreme upper end of the standard 41, as illustrated in Figs. 1 and 3. The lower end of the vertical shaft 65 carries a beveled gear 68, which meshes with the correspondingly-shaped gear 38 upon the carriage-shaft 36. Thus as the shaft 65 is revolved the carriage-shaft 36 is turned also, and the carriage by means of the engagement between its spur-wheel 37 and the rack 23 of the bed is moved upon the bed. The vertical shaft 65 is actuated from the driving-shaft through the medium of the dog 61, which is moved through the medium of the cam 58 upon the said driving-shaft, and the said dog is adapted to engage with the teeth of the ratchet-wheel 69, secured upon the upper end of the vertical carriage-shaft 65, the said ratchet-wheel being provided, also, with a handle 70, whereby the shaft 65 may be revolved in a direction contrary to that imparted to it by the action of the dog when the dog has been carried out of engagement with the ratchet. As the dog acts upon the ratchet at each revolution of the drive-shaft in a manner to revolve the vertical carriage-shaft sufficiently to give sliding movement of the carriage upon the bed in one direction only, and after the carriage has traveled as far as may be desired in that direction, it is returned by manipulating the shaft 65 in a contrary direction through the medium of the handle 70 upon the ratchet.

As a support for the operator when manipulating the machine, a seat 71 is provided, which is attached to the side of the machine-carriage opposite that side carrying the standard 41, as shown in Fig. 3.

In operation when the machine has been placed in position with respect to the stack to be operated upon—that is, with the trestles at opposite sides of the stack and the bed above the stack—the operator by turning the drive-shaft will impart to the knife a vertically-reciprocating movement, and as the carriage is at the same time moved over the stack the knife will cut the hay from the stack in slices, so to speak, and by reversing the position of the machine so that other cuts may be made at right angles to the first cuts the hay may be removed from the stack in solid blocks, which renders it much more convenient for baling and for transportation and even for feeding to stock than when the hay is removed loosely by a fork.

The machine while intended particularly to cut hay in bulk from a stack may be also used for cutting timber or logs into suitable lengths by substituting for the hay-knife a crosscut-saw or other form of saw suitable for cutting wood.

We do not confine ourselves to any particular form of knife or socket for receiving the knife.

Having thus described our invention, we claim as new and desire to secure by Letters Patent—

1. A machine for cutting hay from stacks, comprising trestles, a bed vertically adjustable on the trestles, a carriage mounted to travel on the bed, a vertically-reciprocating cross-head carried by the carriage, a knife secured to the cross-head and projecting below the bed, and means for simultaneously moving the carriage and reciprocating the cross-head, substantially as described.

2. In a machine for cutting hay from stacks and for like purposes, the combination, with trestles and a bed adjustably carried by the trestles, the said bed being provided with a rack and tracks, of a carriage held to travel upon the bed and provided with wheels engaging with the track and a shaft carrying a pinion engaging with the rack, a standard projected from the carriage, a cross-head having movement in the standard and adapted to receive a knife, a driving mechanism journaled upon the standard of the carriage, and a driving connection between the pinion-shaft of the carriage and the driving mechanism, substantially as and for the purpose set forth.

3. In a machine for cutting hay from stacks and for like uses, the combination, with trestles and a bed carried by the trestles and provided with tracks and a rack, of a carriage provided with wheels engaging with the track, a shaft journaled in the carriage and carrying a pinion engaging with the rack of the bed, a standard projected upward from the carriage, a cross-head held to slide in said standard, a drive-shaft, a driven shaft located adjacent to the drive-shaft and driven therefrom, a disk secured to the driven shaft and provided with an adjustable wrist-pin, a pitman connection between the cross-head and the wrist-pin, and a driving connection between the drive-shaft and the pinion-shaft of the carriage, as and for the purpose specified.

4. In a machine for cutting hay from stacks and for like uses, the combination, with trestles and a bed adjustably supported by the trestles, the said bed being provided with tracks and a rack between the tracks, of a carriage held to travel upon the bed and provided with wheels engaging with the tracks above and below, and a shaft carrying a pinion engaging with the rack of the bed, a standard projected upward from one portion of the carriage, a cross-head having movement in the standard and adapted to carry a knife or like cutting implement, a drive-shaft carried by the carriage-standard, a parallel shaft driven from the drive-shaft, a disk secured to the driven shaft and provided with an adjustable wrist-pin, which is connected by a pitman with the cross-head, a vertical shaft having a driving connection with the pinion-shaft of the carriage, and a pawl-and-ratchet mechanism imparting movement to the vertical shaft from the drive-shaft, substantially as and for the purpose specified.

JOHN T. EVANS.
JOSEPH H. DOUGLASS.

Witnesses:
ALEX. D. MCAULAY,
JOHN C. SLATER.